Sept. 6, 1927.
J. E. HEASLET
1,641,331
TRACKLAYING TRACTOR
Filed July 21, 1925
2 Sheets-Sheet 2
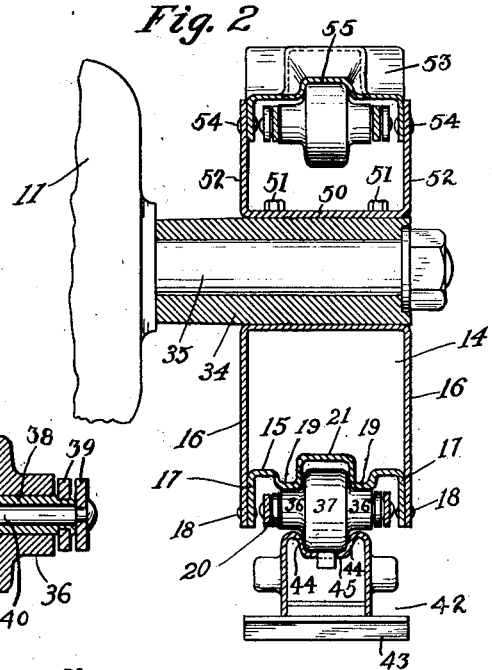
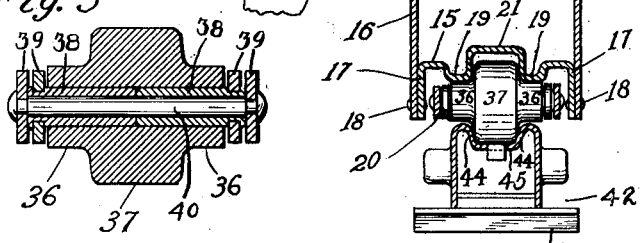
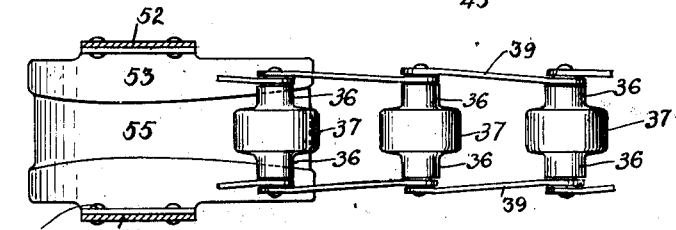
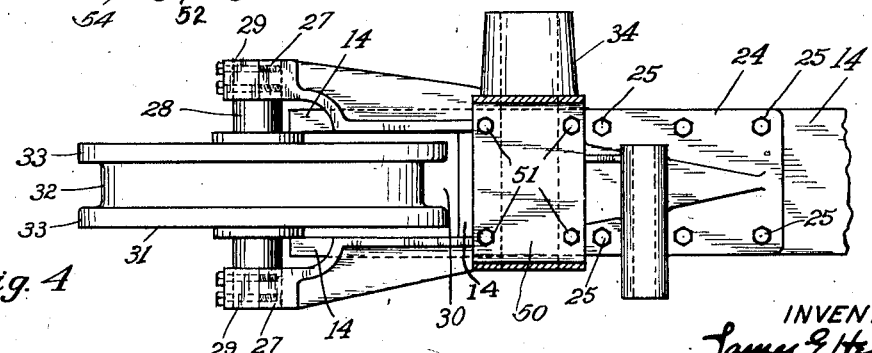
INVENTOR
James E. Heaslet
BY Wayne M. Hart.
ATTORNEY Patented Sept. 6, 1927.

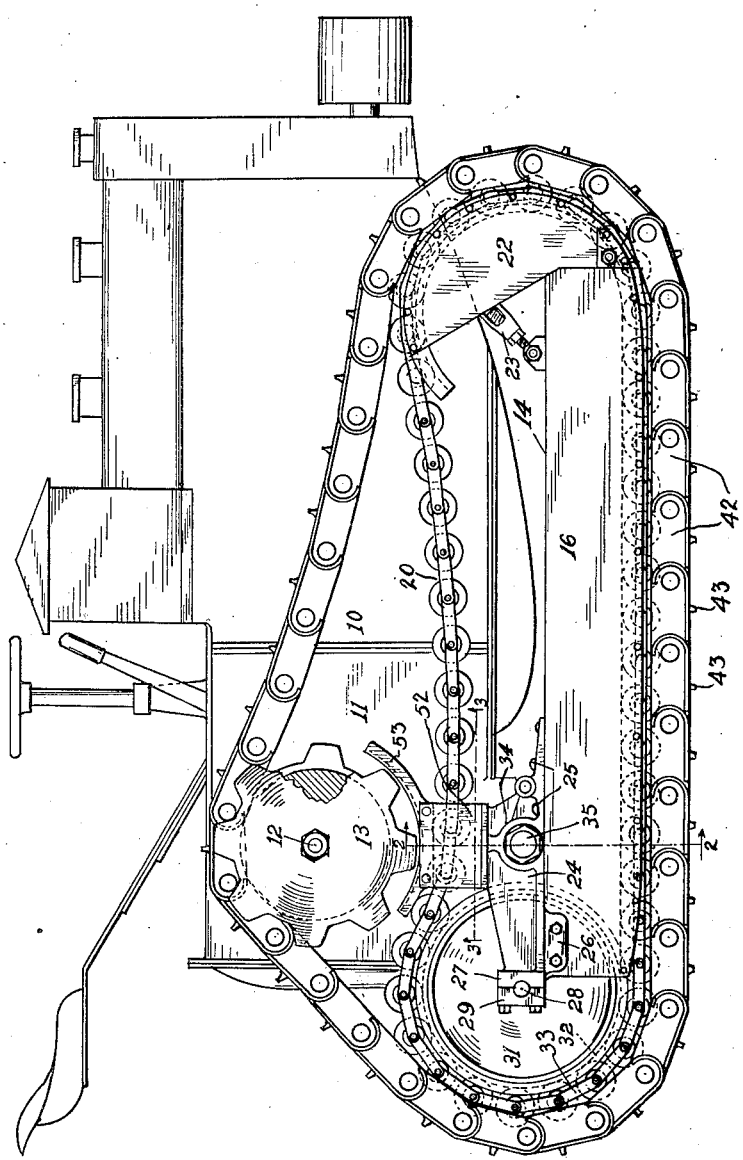

1,641,331

UNITED STATES PATENT OFFICE.

JAMES E. HEASLET, OF CLEVELAND, OHIO, ASSIGNOR TO THE CLEVELAND TRACTOR COMPANY, OF EUCLID, OHIO, A CORPORATION OF OHIO.

TRACKLAYING TRACTOR.

Application filed July 21, 1925. Serial No. 45,034.

This invention relates to traction mechanism for supporting and propelling tracklaying tractors, and more particularly to the type in which endless roller bearing chains are employed intermediate the tracks and the supporting frames.

Tractors, in a great many of their uses, are compelled to travel over uneven ground and roads. In track-laying tractors in which an independent roller bearing chain is interposed between the truck frames and their surrounding endless track chains, the roller chain is subjected to lateral thrusts when the tractor encounters uneven ground conditions. This is caused by the movability of the tracks and the roller bearing chains relative to the supporting truck frames, as the truck frames are mounted so that they remain in the same longitudinal relation with the main frame of the tractor under all conditions. Any lateral movement of the roller bearing chains will cause wear upon the surface of the truck frames they have rolling contact with, or upon the endless track it rolls upon, and such wear eventually causes replacement which is an undesirable condition.

An object of my invention is to provide driving and supporting mechanism for track-laying tractors in which the supporting trucks, roller chains and tracks are formed and associated so that there will be no lateral movement of the roller chains relative to the tractor supporting trucks.

A further object of my invention is to provide for driving and supporting mechanisms for track-laying tractors in which the tracks and roller bearing chains will be maintained in longitudinal alignment with the truck frames during their entire travel.

Another object of my invention resides in the provision of a truck frame and an endless roller chain which are formed and related so that there will be no lateral movement of the roller chain while in rolling contact with the truck frame.

Still another object of my invention is to provide means for shunting and guiding the roller bearing chains in their upper travel.

These and other objects will be apparent from the following description, and annexed drawings in which:—

Figure 1 is a side elevation of a tracklaying tractor embodying my invention;

Figure 2 is a transverse sectional view taken on line 2—2 of Fig. 1 of the supporting and driving mechanism at one side of the tractor;

Figure 3 is a sectional view, looking upward, of the shoe for shunting the travel of the roller chain, and a section of the roller chain;

Figure 4 is a plan view of the bracket which is pivoted to the main frame and carries the idler, and of a fragmentary portion of the truck to which it is secured;

Figure 5 is a transverse sectional view of the roller chain.

Referring now to the drawings by characters of reference, the main frame of the tractor consists of an engine unit 10 and a transmission unit 11 which are secured together in longitudinal alignment. While I have illustrated only one side of the tractor it will be understood that the supporting and propelling mechanism, which I will now describe, are identical on each side of the main frame.

A driven power transmitting shaft 12 extends from the side and near the upper portion of the transmission unit, and a double sprocket 13 is secured upon the transmission shaft. It will be understood that the transmission shafts are driven from suitable mechanism in the transmission unit, which mechanism is coupled with the engine in the usual manner.

The trucks for supporting the main frame each consists of an inverted frame member 14 formed preferably of sheet metal, and a shoe member 15 also preferably formed of sheet metal. The frame member is formed with downturned sides 16 which are parallel and extend longitudinally with the main frame. The shoe member extends the full length of the frame member and is formed with downturned sides 17 which lie against the sides 16 of the frame member and are secured thereto by rivets 18. The shoe member is formed with parallel ribs 19 which extend downwardly, and their lower surfaces provide bearing faces upon which the roller chain 20 has a rolling contact. The shoe, intermediate such ribs, is formed to provide an upwardly extending channel 21, and the ribs and channel both extend the full length of the truck member. The truck includes a pivoted curved front section 22, having a frame member and shoe member of the same cross section as, and forming a continuation of the section described, and a turnbuckle 23 is provided between the two truck sections to swing the front section relative to the other section for the purpose of tensioning the track and bearing chain.

A cast bracket 24 is positioned upon the top and at the rear end of the truck member, and is secured thereto by bolts 25. The bracket is provided with downwardly extending side flanges 26 which are bolted to the downturned sides of the truck frame member. The rear end of the bracket is formed as a yoke and projects beyond the end of the truck. The projecting ends of the yoke are formed as bearing 27 to receive a transversely extending shaft 28, and a cap bearing 29 is bolted to the casting bearing to secure the shaft in position. The top of the truck frame member is cut away longitudinally as at 30, so that the idler 31 can be carried by the shaft 28. The idler is provided with a central channel 32 which is in longitudinal alignment with and similar to the channel in the shoe, and the rim portions 33 at each side of the channel provide bearing faces which are in longitudinal alignment with the ribs 19 of the shoe. The bracket is also formed with a transversely extending bearing 34 through which a shaft 35 extends. The shaft 35 is in vertical alignment with the driving shaft 12, and provides a connection upon which the truck can rock in a vertical plane. It will be understood that suitable spring suspension is provided intermediate the forward ends of the trucks and the engine unit of the main frame.

The endless roller-bearing chain 20 extends around the truck and the idler and consists of a plurality of similar roller-bearings connected together by links. The side portions of the rollers are of the same diameter and provide annular roller bearing faces 36. The portion of the rollers intermediate the side portions is of larger diameter and provides an annular bearing face 37. The bearing faces 36 of the rollers when passing around the trucks will have a rolling contact with the bearing faces of the ribs 19 of the shoe, thus providing a spaced double bearing contact. The larger central portion of the rollers will project into the channel 21 in the shoe and will serve to take up any lateral thrusts so that there will be substantially no lateral movement of the roller chain relative to the truck while in rolling contact with the shoe. It will thus be seen that there will be no wear on either the truck or rollers due to lateral tilting or misalignment of the rollers relative to the truck.

The rollers are provided with an axially extending aperture in which a two part hollow bearing 38 extends. The ends of the hollow bearings projecting from the rollers are of reduced diameter to receive an end of a pair of links 39, and after such assembly, the ends of the hollow bearing are turned back to secure the links thereon. A pin 40 extends through the two part hollow bearing, and an end of a pair of links 39, extending in the opposite direction from the links 39, are assembled upon the reduced projecting ends thereof. After such assembly the ends of the pin are upset to retain the links therewith. The endless roller chain is formed by associating links in the manner described with a plurality of similar rollers.

An endless track for propelling the tractor surrounds the endless roller chain and the truck, and extends over the driven sprockets 13. The endless track is comprised of a plurality of similar track units 42 which are pivotally connected together, and provided with grouters 43 on their ground engaging faces. The shoes are preferably formed with a channel rail 45 having side flanges 44, the channel being of a width similar to the channel in the truck shoe and in vertical alignment therewith, when the endless track is assembled with the truck. The larger central portion 37 of the rollers extend into the track channel and have a rolling contact thereupon.

The roller chain extends around the truck and the idler mounted at the rear end thereof, the bearing surfaces 36 of the rollers rolling against the rim faces 33 and the larger face 37 of the rollers rolling in the channel 32 of the idler. Mechanism is provided to shunt the roller chain beneath the driving sprockets 13 and also to maintain the upper run of the chain in alignment with the forward end of the truck. This mechanism consists of a support 50, which is secured to the bracket 24 by bolts 51, having upwardly extending sides 52, and a shoe member 53. The sides of the shoe member are turned down and are secured to the sides of the support by rivets 54. The shoe member is curved and lies beneath the sprocket 13, the under side thereof being formed with a channel 55 in which the rollers engage. The ends of the channel 55 are flared and the central portion thereof is in longitudinal alignment with the channel in the idler and in the shoe of the front truck section. The chain is assembled to travel beneath the shoe 53 when it passes from the idler, thereby preventing contact with the sprocket and controlling the lateral position of the chain in its upper travel. When the endless track chain is driven the roller chain will move therewith due to the rolling contact, but at a slower rate of speed.

With the structure herein described the life of the track, roller chain and truck frame are very materially lengthened.

Various changes can be made in the structure described without departing from the spirit of my invention and the scope of what is claimed.

What I claim is:—

1. In a tractor, a main frame having driving sprockets at each side thereof, a truck frame connected to each side of said main frame in a plane beneath said sprockets, an endless track chain extending around each truck frame and over the sprocket thereabove, a roller chain intermediate each of said track frames and their surrounding track chains, and a channelled shoe secured to each of said truck members below the said sprockets for shunting said roller chains away from and beneath said sprockets; said shoes having guideways in which the rollers of said chains engage to maintain said roller chain in alignment during its upper travel.

2. In a track-laying tractor, a supporting truck comprising sheet metal truck frame members having longitudinally downwardly extending sides, sheet metal guide members secured intermediate said downwardly extending sides, driving sprockets disposed above and separate from the frames at each side of the tractor, endless driven tracks around said truck frames, and endless roller bearing chains disposed between said track and said truck frames and driven by the driving sprockets, arcuate shoes disposed beneath said driving sprockets, said shoes being formed with upwardly pressed longitudinally extending channels disposed partly about the sprocket wheels, and with longitudinally extending surfaces on each side of the channels, said surfaces providing roller bearing surfaces for said roller bearing chains, and said channels providing a guiding surface for each roller bearing chain to shunt the same between the shoes and the truck frames.

3. In a tractor, a main frame, a truck frame secured to each side of said main frame, driving sprockets supported by each side of said main frame above said truck frames, idler wheels at the rear end of each truck frame below said driving sprocket, shoes disposed below said driving sprockets, an endless track extending around each of said truck frames and over said driving sprockets on each side of said main frame, endless roller bearing chains intermediate each of said truck frames and the surrounding tracks and disposed about the idler sprockets, each of said roller chains being shunted below and between the driving and idler sprockets by said shoes.

4. In a tractor, a main frame, a truck frame secured to each side of said main frame, driving sprockets supported by each side of said main frame above said truck frames, idler wheels at the rear end of each truck frame below said driving sprockets, shoes disposed below said driving sprockets, endless tracks extending around each of said truck frames and over said driving sprockets on each side of said main frame, endless roller bearing chains intermediate each of said truck frames and the surrounding tracks and disposed about the idler sprockets, said shoes comprising arcuate-shaped channelled plates secured to the truck frames and disposed about the lowermost portion of the driving sprockets, each of said roller chains being shunted below and between the driving and idler sprockets by said shoes.

In testimony whereof I hereunto affix my signature.

JAMES E. HEASLET.